Oct. 29, 1968            V. E. HAMREN            3,407,476
FABRICATION METHOD FOR A ROTARY SEAL ASSEMBLY
Filed March 18, 1966            2 Sheets-Sheet 1
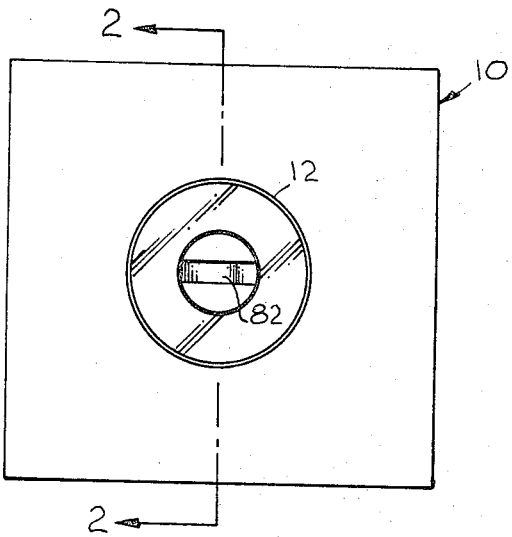
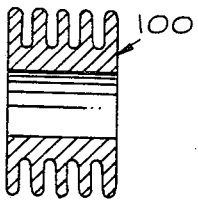
Fig. 4(a)
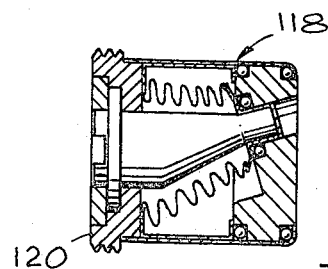
Fig. 3
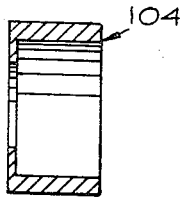
Fig. 4(c)
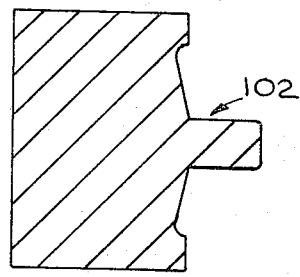
Fig. 4(b)
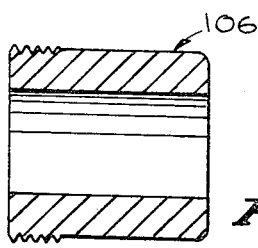
Fig. 4(d)
INVENTOR
VICTOR E. HAMREN
BY Samuel Lindenberg
Arthur Frielich
ATTORNEYS

INVENTOR.
VICTOR E. HAMREN

United States Patent Office 3,407,476
Patented Oct. 29, 1968

3,407,476
FABRICATION METHOD FOR A ROTARY SEAL ASSEMBLY
Victor E. Hamren, Los Angeles, Calif., assignor to Mechanized Science Seals, Incorporated, Los Angeles, Calif., a corporation of California
Filed Mar. 18, 1966, Ser. No. 535,377
4 Claims. (Cl. 29—423)

ABSTRACT OF THE DISCLOSURE

A method of fabricating an assembly which is used to hermetically seal an opening in a chamber wall while permitting the transfer of rotary motion therethrough. The assembly includes a substantially cylindrical bellows joined to the flange of a cap into which an eccentric end of an input shaft projects. The cap and bellows are formed by an electroless plating process so that the wall thickness of each can be held below .005 inch. By forming the cap in this manner, the cap flange is able to resiliently flex relative to the cap boss, thereby reducing the strain on the bellows convolutions.

---

This invention relates generally to small mechanical assemblies and more particularly to a method of fabricating a hermetically sealed assembly useful for coupling rotary motion from outside to inside a chamber wall.

Many applications require that rotary motion be coupled from the outside to the inside of a chamber through an opening in the chamber wall. It is also a requirement in many of these applications that the opening in the chamber wall be hermetically sealed to prevent any leakage therethrough. Several devices satisfying these requirements are known in the prior art and although they have proved to be adequate in many applications, they are often either unsatisfactory or very expensive when small dimensions and extremely close tolerances are required, such as in miniature gyro devices. As an example, a need exists for accurate rotary assemblies whose maximum dimension is less than one quarter of an inch.

In view of this, it is an object of the present invention to provide a method of fabricating an improved heremtically sealed rotary assembly which is less expensive than previously known assemblies. In addition, it is also an object of the present invention to provide a method of fabricating such an assembly which enables very small dimensions and very close tolerances to be achieved.

Prior art assemblies are known in which rotary motion is transferred to the inside of a chamber by mounting an input shaft for rotation in an opening in the chamber wall. Such an input shaft is usually provided with an eccentric end portion which is disposed inside the chamber for driving a rotatable output shaft. In accordance with the present invention, a seal is provided for hermetically sealing the opening through which such an input shaft projects and includes a substantially cylindrical bellows joined to the flange of a cap into which the eccentric end projects. More particularly, the cap includes in addition to the flange, a hollow substantially cylindrical boss. The eccentric end of the shaft extends into and is rotatable in the hollow boss. As the shaft is rotated from outside of the chamber, the eccentric end rotates in and transfers lateral motion to the hollow boss. The flange on the cap portion in turn transfers this motion to the bellows thus compressing one side of the bellows while extending the other.

In order to minimize the dimensions of the assembly while assuring adequate operating characteristics, the bellows in accordance with the invention is preferably formed by any suitable electroless plating process, a typical one of many such processes being described in U.S. Patent 3,040,426. Electroless plating enables a bellows having a uniformly thin wall (less than .005 inch) to be fabricated. In accordance with a significant feature of the present invention, the cap is also formed by an electroless plating process so its wall thickness can be held below .005 inch. By so doing, the cap flange is able to resiliently flex relative to the cap boss, thereby reducing the strain on the bellows convolutions.

In addition to reducing the strain on the bellows, several other advantages are attained by forming the cap portion via a plating process, rather than by machining, for example. More particularly, plating enables the cap to be formed of a nickel or other metal alloy which provides a very hard surface and thus is well suited for the bearing loads it must sustain. In contrast, it is very difficult and expensive to machine bearing type alloys to thin wall dimensions and close tolerances because of the tendency of the material to distort in such machining operations. Machinable materials, such as stainless steel, do not have nearly as good hardness characteristics as plated nickel alloys. Further, regardless of what material is employed, it is virtually impossible to uniformly machine wall thicknesses to below .005 inch which dimensions are easily attainable by plating. Aside from reducing strain on the bellows, a minimum cap wall thickness enables the dimensions of the shaft eccentric end to be maximized thus providing greater torque capabilities for any particular size assembly. In addition, plating enables closer tolerances to be more easily attained since it is much easier to accurately machine the outer diameter of an aluminum form to be plated than to bore the inner diameter of a small element.

In one embodiment of the present invention, the cap flange is joined to the bellows as by welding or soldering. In an alternate embodiment of the invention, the cap and bellows can be integrally formed. The operating characteristics of the two embodiments will be substantially the same and economic and functional considerations should dictate which one is to be preferred.

In a preferred embodiment of the invention, a housing is provided which is to be mounted in the opening of the chamber wall. The housing internally supports the bellows and input shaft. In accordance with a significant feature of the present invention, the housing is also formed by an electroless plating process, which easily and inexpensively permits it to be provided with certain significant characteristics. For example, in a preferred embodiment of the invention, the housing is plated so as to define inner and outer threads which are useful both for retaining elements therein and for mounting the assembly. In addition, the housing can be shaped to define bearing seats.

The novel features that are considered characteristic of this invention are set forth with particularity in the appended claims. The invention will best be understood from the following description when read in connection with the accompanying drawings, in which:

FIGURE 1 illustrates an external plan view of an embodiment of the invention supported in a chamber wall for coupling rotary motion from outside to inside the chamber wall;

FIGURE 3 is a sectional view similar to FIGURE 2 illustrating an alternative embodiment of the invention; and FIGURES 4(a)–(d) illustrate disintegrable forms which are employed in accordance with a preferred technique for fabricating elements of the rotary assembly of FIGURE 2.

Figure 2:
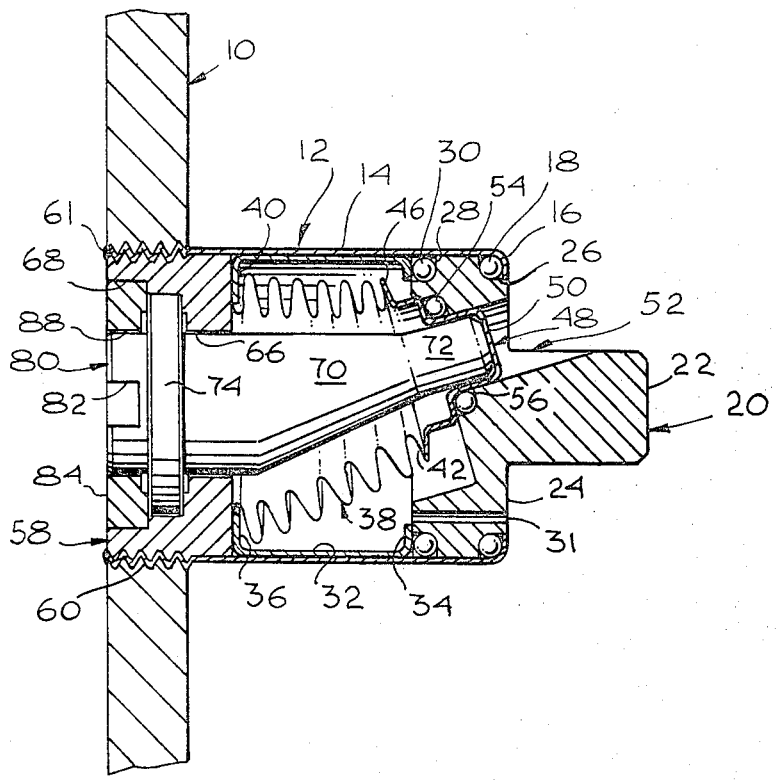
FIGURE 2 is a sectional view taken substantially along the plane 2—2 of FIGURE 1 illustrating a preferred embodiment of the invention.

Attention is now called to FIGURE 1 which comprises an external view of a portion of a chamber wall 10 having a rotary assembly 12 mounted therein for coupling rotary motion from the outside to the inside of the chamber wall.

As is best shown in FIGURE 2, a preferred embodiment of the assembly 12 is comprised of a substantially cylindrical housing 14 which is hollow and has first and second open ends. The second end of the housing 14 terminates in an inwardly curved portion 16 which at its inner radius provides a partial seat for ball bearings 18. An output shaft member 20 having a central shaft portion 22 and a flange portion 24 is disposed within the housing 14 adjacent the second end thereof. The forward outer edge 26 of the flange portion 24 is curved inwardly as illustrated in FIGURE 2 to thus also provide a partial seat for the ball bearings 18. That is, the ball bearings 18 are received between the curved edge 26 of flange portion 24 and the inwardly curved end portion 16 of the housing 14. A circumferential arcuate recess 28 is formed at the rear edge of the flange portion 24 of the output shaft member 20. The recess 28 provides a partial seat for ball bearings 30. A pressure equalizing apertures 31 is preferably provided through the flange 34.

A substantially cylindrical spacer member 32 is received within the housing 14. The front ends of the spacer member 32 are directed inwardly as at 34 to form a flange for retaining the ball bearings 30 in the recess 28. The rear end of the spacer 32 is likewise directed inwardly as at 36 to form a flange.

A hollow bellows member 38 having first and second open ends is provided. The first bellows end 40 is secured to the inwardly directed flange 36 of the spacer 32 as by welding or soldering. A second end 42 of the bellows is circumferentially joined to the outer edge of a flange 46 of a cap 48. In addition to the flange 46, the cap 48 includes a hollow substantially cylindrical boss 50.

The cylindrical boss 50 of the cap 48 is adapted to project into an eccentrically positioned opening 52 in the output shaft member 20. Ball bearings 54 are disposed between the cap portion 48 and a recess 56 formed adjacent the opening 52 in the output shaft member 20.

The spacer 32 is held in the housing by a plug 58 which bears against the flange 36 of the spacer 32. Thus, the spacer loads both the bearings 30 and 54. In the preferred embodiment of the invention, the housing 14 is provided with both external and internal threads adjacent its first end. The plug 58 is externally threaded and adapted to be threadedly engaged within the housing 14. Epoxy 61 can be deposited at the boundary between the housing 14 and plug 58 if desired. The external threads on housing 14 can be used for mounting the housing within the opening in the chamber wall 10 as illustrated in FIGURE 2.

The plug 58 defines a central opening 66 at the front thereof and a larger intermediate opening 68 behind the opening 66. An input shaft 70 is adapted to be projected through the openings in the plug 58. The input shaft 70 has an eccentric end portion 72 adapted to project into the substantially cylindrical boss 50 on the cap member 48. In addition, the input shaft 70 has a flange 74 adapted to be received in the opening 68 in the plug 58. The end 80 of the input shaft 70 remote from the eccentric end 72 is provided with a slot 82 to facilitate rotation of the input shaft 70.

A locking member 84 is adapted to be secured in the rear opening 86 of the plug member 58 either by spinning the edges of the plug member 58 thereover or by the use of epoxy, or both. The locking member 84 thus prevents lateral movement of the flange 74 of the input shaft 70 but permits relative rotation thereof.

In the operation of the embodiment of FIGURE 2, in order to couple rotary motion through the chamber wall 10, the input shaft 70 can be rotated by the use of a screwdriver placed into slot 82. Rotation of the input shaft 70 causes the eccentric end 72 to describe a circle about the central axis of the input shaft. The input shaft 70 is free to rotate within the hollow boss 50 on the cap member 48. However, its translational movement is coupled to the cap member 48 which inturn couples it to the output shaft member 20. Thus the shaft member 20 will rotate on the ball bearings 18 and 30.

As the input shaft 70 rotates, one side of the bellows will be compressed as shown in FIGURE 2 while the opposite side of the bellows will be extended.

As previously noted, many applications exist for rotary assemblies of very small size and weight, e.g. having a maximum dimension of one quarter inch. For example, such assemblies are useful in space vehicles where it may be desired for instance to provide means for externally adjusting controls within a hermetically sealed chamber, such as a miniature gyro. By employing a fabrication technique to be discussed more specifically hereinafter, rotary assemblies of the type shown in FIGURE 2 can easily be provided in which the diameter and length of the housing 14 can, for example, be on the order of 0.1 and .2 inch respectively. Prior art attempts to provide a rotary assembly having such small dimensions have not been very successful inasmuch as all of these attempts have involved utilizing machined parts which are not readily capable of being fabricated with sufficiently small tolerances at reasonable cost levels.

In accordance with the present invention, the rotary assembly as shown in FIGURE 2 is fabricated to such small dimensions and exceedingly close tolerances by utilizing plated elements wherever possible.

More particularly, the bellows member 38 can be very accurately formed by plating the bellows form shown in FIGURE 4(a). Plating is preferably performed by any one of several suitable electroless plating processes, one typical such process being described in U.S. Patent 3,040,426. Such a process involves utilizing an accurately machined form 100, e.g. aluminum having an external shape identical to the element desired. The form is then plated with a thin shell of a suitable alloy, e.g. nickel. After appropriate treatment, the form is chemically etched out of the shell thereby providing a bellows of desired characteristics. Such plating techniques enable bellows having very thin walls, i.e. in a range between .002 and .005 inch to be provided.

Similarly, the cap member 48 should be formed by electrolessly plating the cap form 102 shown in FIGURE 4(b) and subsequently etching the form from the plated shell. Therefore, the cap 48 can also have a wall whose dimensions are on the order of .005 inch. It is particularly desirable that the cap member wall be thin inasmuch as it permits the flange 46 thereof to flex thereby relieving some of the strain which would otherwise be transferred to the bellows convolutions. In addition, by providing a cap 48 with a very thin wall, the cross-section of the input shaft eccentric end 72 can be increased for a fixed size assembly thus enabling a larger torque to be sustained.

In addition to forming the bellows and cap by plating, the spacer 32 and housing 14 can likewise be formed by an electroless plating process so that the walls thereof do not exceed .005 inch in thickness. Suitable spacer and housing forms 104, 106 are illustrated in FIGURES 4(c) and (d). It is to be noted that due to the thinness of the plated material, the threads on the housing 106 will appear as both internal and external threads on the housing 12 of FIGURE 2. It is also again pointed out that two or more plated members can be integrally formed, e.g. the bellows and cap members can ver satisfactorily be integrally plated on a composite form. In addition to the foregoing, the thinness of the housing permits it to flex slightly at the curved portion 16 to thereby assure free movement of the balls 18 by compensating for any possible distortion in the curved forward edge 26 of the machined shaft member 20.

FIGURE 3 illustrates an alternative embodiment 118 of the invention which is very similar to the embodiment of FIGURE 2. FIGURE 3 is different however in that the plug 120 is externally threaded for direct engagement with the chamber wall 10. In order to enable this, the housing is shortened and secured to the plug by welding, soldering, or epoxy. The shaft portion of the output shaft member has been deleted in FIGURE 3 in order to suggest that eccentric end of the input shaft can be coupled to various structures within the chamber and need not employ member 20 as shown in FIGURE 2. An additional embodiment of the invention (not shown) can be similar to FIGURE 2 except however the threads on the housing can be deleted. In this event, the housing can be secured to the chamber wall 10 and to the plug 58 by welding, soldering, or epoxy.

From the foregoing, it should be appreciated that a rotary assembly has been disclosed herein which is capable of being fabricated to very small dimensions having exceedingly close tolerances by forming at least several of the elements thereof by electroless plating which enables very close tolerances to be maintained in elements having wall thicknesses below .005 inch.

What is claimed is:

1. A method of fabricating a rotary assembly including a hermetic seal adapted to be supported inside a chamber wall around an opening therein for permitting rotary motion to be coupled through said opening while preventing leakage therethrough, said method including the steps of:
    preparing a first form having the shape of a bellows;
    preparing a second form defining a flange having a substantially cylindrical boss projecting substantially perpendicularly therefrom;
    electrolessly depositing a first shell on said first form having a uniform thickness less than .005 inch;
    electrolessly depositing a second shell on said second form having a uniform thickness less than .005 inch;
    removing said first form from said first shell to thus provide a hollow bellows having first and second open ends;
    removing said second form from said second shell to thus provide a cap including a hollow substantially cylindrical boss having a flange projecting substantially perpendicularly therefrom; and
    closing one end of said bellows by joining said flange thereto.

2. The method of claim 1 including the additional steps of securing said second end of said bellows within a housing:
    mounting said housing within said chamber wall opening; and
    mounting a shaft having an eccentric end portion in said housing with said eccentric end portion projecting into and being rotatable in said hollow boss.

3. The method of claim 1 wherein said first and second shells deposited on said forms are comprised of the same material.

4. The method of claim 1 wherein said forms are removed from said shells by chemical etching.

References Cited

UNITED STATES PATENTS

| | | | |
|---|---|---|---|
| 2,832,676 | 4/1958 | Llewellyn et al. | 156—13 |
| 1,736,974 | 11/1929 | King | 74—17.8 |
| 1,842,149 | 1/1932 | Clifford | 29—454 X |
| 3,040,426 | 1/1962 | Hamren | 29—423 |
| 3,191,285 | 1/1965 | Shamie | 29—423 |

THOMAS H. EAGER, *Primary Examiner.*